Aug. 23, 1966     A. LENKEY ETAL     3,268,117
DISPENSING HEAD
Filed April 9, 1965     3 Sheets-Sheet 1
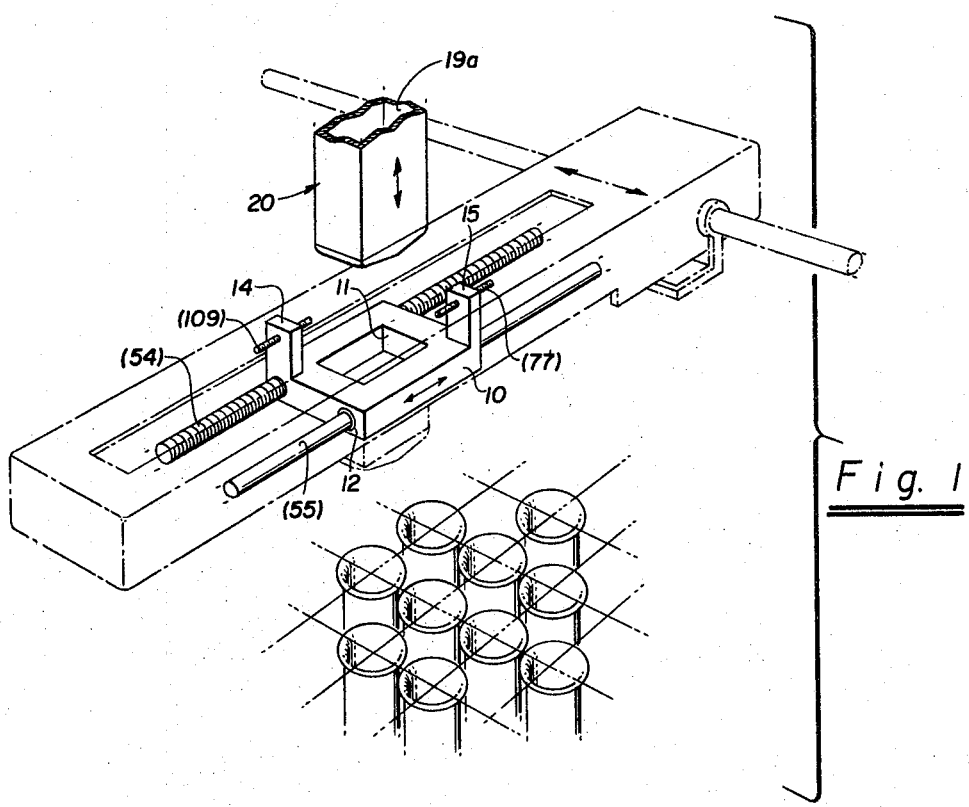
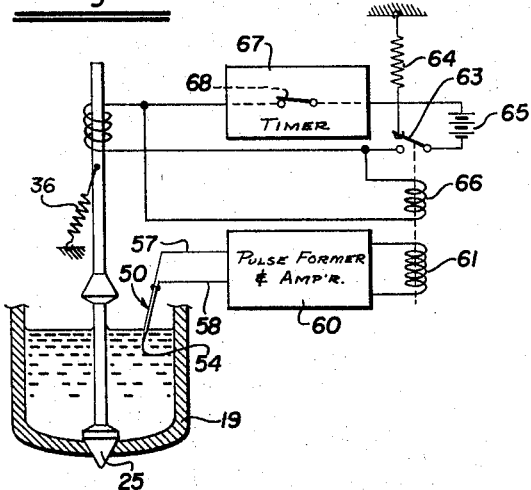
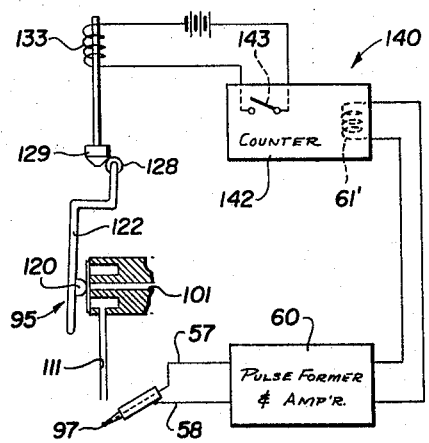
INVENTOR.
Andrew Lenkey
BY   Robert J. Ehret
Attorneys INVENTOR.
Andrew Lenkey
Robert J. Ehret
BY
Attorneys

United States Patent Office 3,268,117
Patented August 23, 1966

3,268,117
DISPENSING HEAD
Andrew Lenkey, Menlo Park, and Robert J. Ehret, Los Altos, Calif., assignors to Beckman Instruments, Inc., a corporation of California
Filed Apr. 9, 1965, Ser. No. 446,959
8 Claims. (Cl. 222—14)

This invention is a continuation-in-part of our co-pending application Serial No. 175,252, filed Feb. 23, 1962, now Patent No. 3,181,574, of May 4, 1965.

This invention relates generally to fluid fraction collectors and more particularly to dispensing heads for fluid fraction collectors and mountings therefor.

Fraction collectors are generally used to dispense controlled small volumes of fluid samples into each of a series of test tubes disposed in an array whereby an analysis of either the sample or collection pattern can be obtained. The measuring of the amount or number of units of fluid delivered has generally been by one of three methods, viz., counting of drops, measuring the volume, and by supplying liquid for measured time periods.

Where the flow rate of fluid to the fraction collector is very small, discrete drops of fluid are dispensed by a dispensing head to the test tubes and counted as they are delivered. Where a higher flow rate of fluid to the fraction collector is to be encountered measured volumes thereof are accumulated for each test tube and then delivered. It is sometimes desirable, however, to collect fluid for predetermined periods of time so that the amount thereof collected for such fixed periods can be examined for various periods during the day. In such an instance, collecting fluids by the time method is utilized.

Interchangeable dispensing heads for fluid fraction collectors have been shown in our above identified application, as well as a fraction collector having a head mount accommodating a set of interchangeable heads so as to provide a versatile fraction collector apparatus.

As mentioned in the above application, where the measured volume method of collecting fractions is employed, it is to be appreciated that during the time the fraction is draining, the continuing influx of fluid to the collector adds an unmeasured amount to the volume being dispensed. This results in delivery of inaccurate volumes of liquid. Accordingly, the dispensing head includes means for arresting the influx of fluid to the head during the time the head is draining.

In the above application spaced electrodes, when contacted by the liquid fraction, serve to control the valving of the head. In the present invention the valving of the head is controlled in response to liquid contact with an electrical element. The apparatus disclosed herein is more suitable for use with liquids which are characteristically non-conductive or wherein the passage of current through the liquid may be dangerous or have deleterious effects.

It is a general object of this invention to provide an improved dispensing head for fluid fraction collectors.

It is a more particular object of the present invention to provide a dispensing head which is responsive to contact with liquid fractions.

It is another object of the invention to provide a dispensing head controlled by a thermo-responsive impedance element.

It is yet another object of the invention to provide an improved thermo-responsive control circuit for liquid dispensing heads wherein a steady thermal reference level is maintained for developing a difference signal in response to sensed liquid temperatures to provide improved operation.

These and other objects will be more readily apparent from the following detailed description of preferred embodiments when taken in conjunction with the drawings in which:

FIGURE 1 is an enlarged perspective view of a traveling mount for interchanging the dispensing heads.

FIGURE 3 shows a circuit for controlling the head of FIGURE 2 at the moment of fluid contact with the proble but before the solenoid coils have reacted thereto;

FIGURE 5 shows a circuit for control of the head in FIGURE 4 according to the invention.

Figure 2:
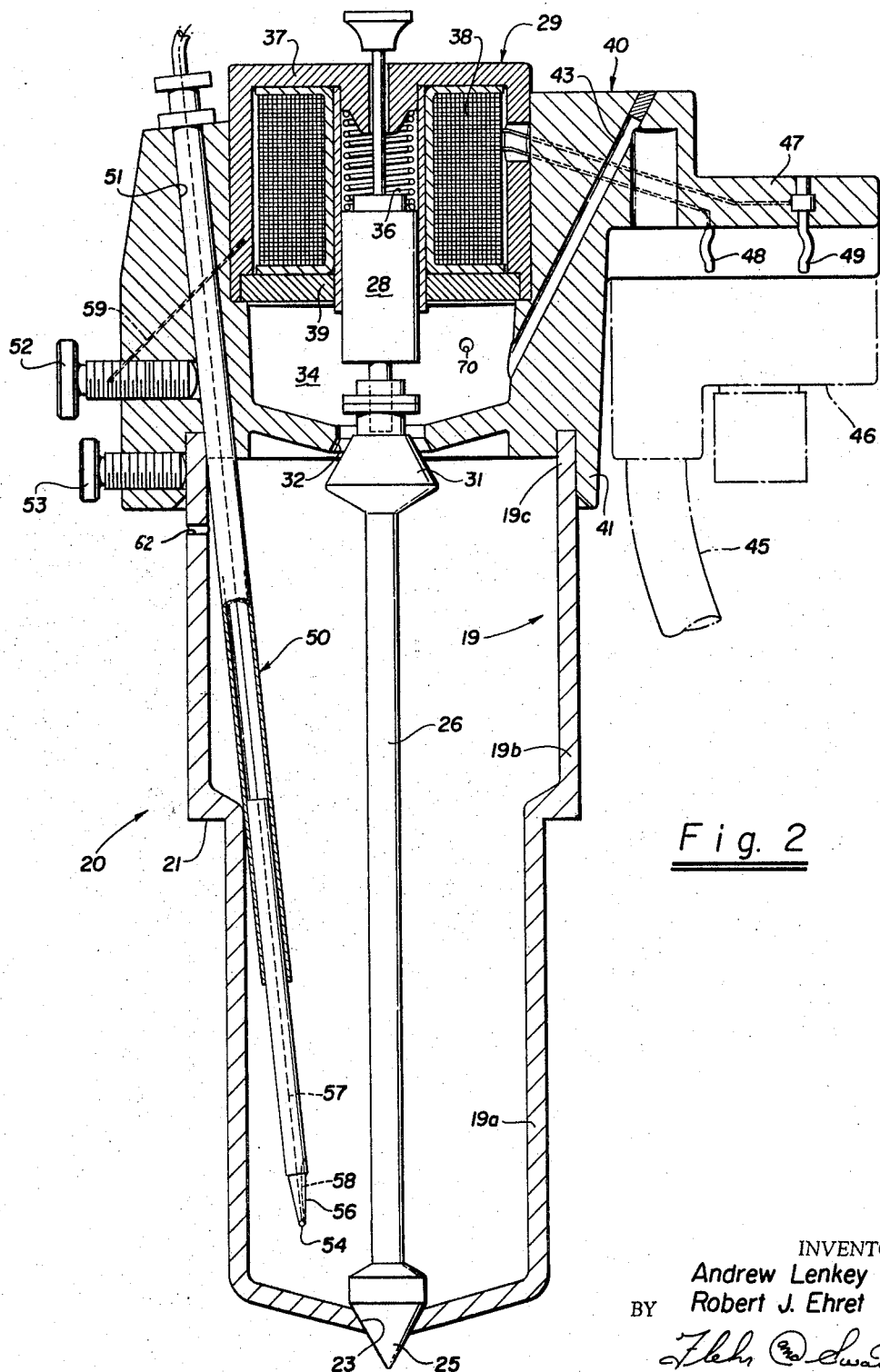
FIGURE 2 is an elevation half-section view showing a volume dispensing head.
Figure 4:
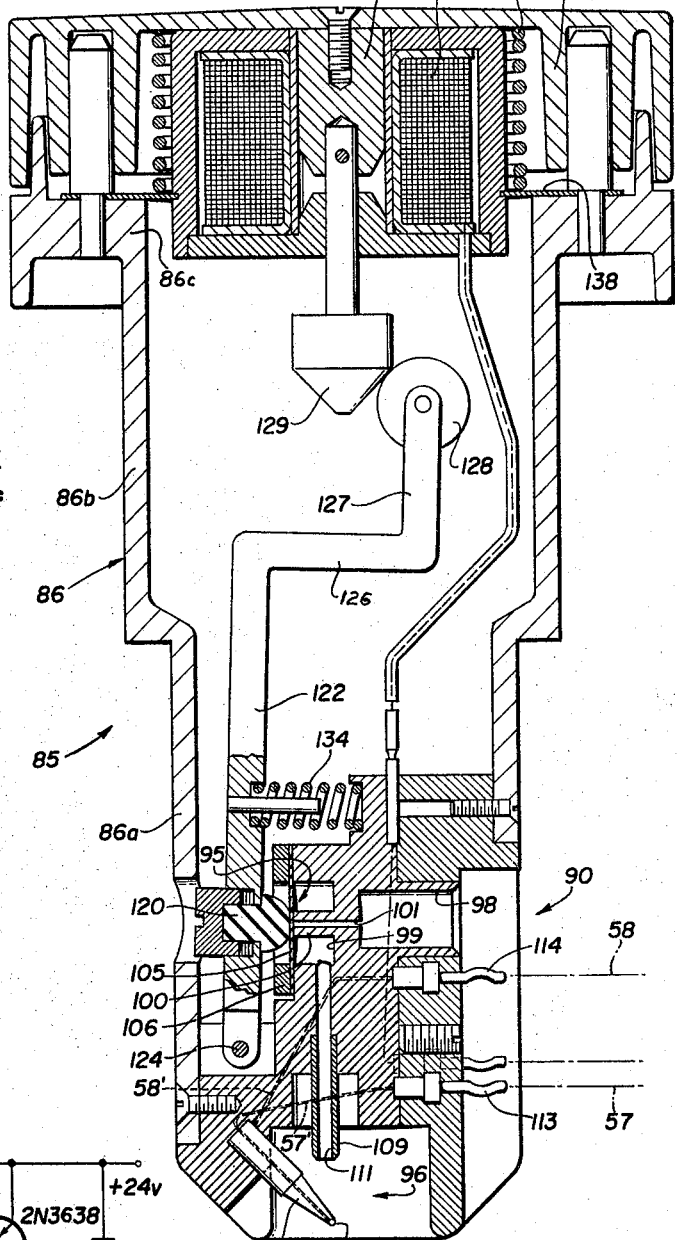
FIGURE 4 is an elevation half-section view showing a drop counting head embodiment according to the invention, as energized.

Briefly, there is shown a traveling bed designed to interchangeably receive one or the other of two or more fraction dispensing heads. The heads include a pair of conductors which support a thermo-responsive impedance element arranged to make contact with the fluid being collected. The electrical impedance coupling between the two conductors via the element is varied by contact with the fraction and sensed to control valving of the fluid to the test tube located directly beneath the dispensing head.

A suitable fraction collector for utilizing the traveling bed shown in FIGURE 1 is described in United States Letters Patent 3,168,124. Briefly, the fraction collector referred to is of the type wherein a dispensing unit is arranged to be advanced step-wise along a column of test tubes until it has serviced the last test tube in the column. At that point the dispensing unit is laterally and forwardly moved to the start of an adjacent column where it again moves step-wise through the test tubes of the next column. The step-wise movements of the dispensing unit therefore progress very much as a normal reading scanning movement.

The dispensing unit in U.S. 3,168,124 is under control of a lead screw 54 as shown herein in FIGURE 1. As described herein, and with particular reference to the components shown in FIGURE 1, certain reference numerals appear in parentheses and these reference numerals are to be understood to refer to substantially corresponding components found in U.S. 3,168,124.

Referring to FIGURE 1 there is shown a bed 10 of substantially rectangular construction having a rectangular hole 11 formed vertically therethrough. Bed 10 is supported upon a lead screw 54 and a support rod 55 both of which pass lengthwise through the sides of bed 10. Lead screw 54 coacts with threads (not shown) formed in bed 10 so that rotation of screw 54 will move bed 10 in a direction dependent upon the direction of rotation thereof. A plastic sleeve or bushing 12 is interposed between rod 55 and the interior cylindrical surface of a hole bored through bed 10. Bed 10 is further formed with a pair of upright members 14 and 15 diagonally oriented on the top surface of bed 10. Each of members 14 and 15 carries a screw 109, 77 respectively disposed substantially parallel to the direction of movement of bed 10 for operating limit switches. Thus, screw 109 is arranged to close a first limit switch which reverses the direction of movement of bed 10 while screw 77 performs a similar function for movement in the opposite direction. Disposed directly in line with opening 11, and shown above the opening in phantom lines, is the bottom portion of a measured volume fraction dispensing head 20 which can be dropped directly into opening 11 until it rests upon a shoulder 21 (FIGURE 2). Shown directly below bed 10 and integral with it is a catch member 90 which operates a lever arm in U.S. 3,168,124, to provide lateral movement of bed 10 and its associated structure to an adjacent column of test tubes.

A measured volume dispensing head 20 for delivering fluid includes a bucket 19 having a lower portion 19a of substantially rectangular cross-section. Bucket 19 is of one piece construction and extends vertically to provide a larger rectangular shaped upper portion 19b. Bucket 19 also includes a circular bowl-shaped top portion 19c. Shoulder 21 is formed on the exterior of bucket 19 between portions 19a and 19b. Shoulder surface 21 rests upon the upper surface of bed 10 when bucket 19 is dropped into opening 11 thereby making the dispensing head easily removable from bed 10. Finally, the bottom of bucket 19 is provided with a discharge outlet 23 shaped to snugly receive a valve 25.

Valve 25 is mounted upon a valve stem 26 axially disposed vertically through the center of bucket 19 and secured to the armature 28 of a solenoid 29. At the upper end of valve stem 26 is a conically shaped valve 31 disposed to face away from valve 25 to control an interconnecting port 32 between the interior of bucket 19 and a fluid accumulator chamber 34. Downward movement of valve stem 26 closes outlet 23 while opening port 32 to permit fluid to pass from accumulator chamber 34 into the interior of bucket 19. When stem 26 is moved upwardly by solenoid 29, port 32 closes and outlet 23 opens to drain fluid from bucket 19, thereby preventing further influx of fluid into bucket 19 during drainage of the latter. Vents 70, 62 permit draining without forming a back suction. Valve stem 26 is biased downwardly into a closed position by a spring 36 interposed between the upper end of armature 28 and a cap 37 of solenoid 29. Solenoid 29 further includes a coil 38 and a base plate 39 which fits within the bottom of cap 37 and forms the top of chamber 34 as well as supporting solenoid 29. The underside of plate 39 is coated with a protective coating to resist corrosive action of liquids being handled.

Outlet 23 is normally closed to accumulate fluid in bucket 19 as it enters via normally open port 32. During dumping of fluid from bucket 19, however, upward movement of stem 29 serves to open outlet 23 and close port 32. While port 32 is closed, fluid temporarily accumulates in chamber 34 and is, therefore, not added to the amount being delivered via outlet 23. At the same time, virtually no back pressure is built up in the feed line.

Accumulator chamber 34 is formed as a hollowed out or drilled hole in a unitary closure structure 40 provided with an annular sleeve 41 portion which snugly receives the upper open end of the bowl-shaped top portion 19c. Unitary closure structure 40 as previously noted includes an interconnecting port 32 of conical shape conforming to the outer shape of valve 31. A drilled passageway 43, plugged at its outer end, communicates with chamber 34 and links it with a source of fluid (not shown) being fed to enter via a hose 45. Hose 45 is held for convenience by a bracket 46 secured by a knurled screw to the underside of an electrical and fluid connection portion 47 of body 40. Terminals 48, 49 are connected to operate coil 38.

As shown in FIGURE 2, an ullage probe 50 extends into the interior of bucket 19 through a substantially vertical hole 51 drilled downwardly through the top of closure structure 40 to emerge interiorly of sleeve 41. A thumb screw 52 retains probe 50 and another thumb screw 53 retains bucket 19.

Probe 50 is preferably a hollow stainless steel tubular element. A thermo-responsive impedance element is carried by probe 50 to be contacted by liquid within bucket 19 thereby controlling operation of the valving function.

A miniature thermistor bead 54, embedded in a conical glass tip 56, is secured to the lower end of probe 50. Such a bead 54 is of very small mass requiring, in a typical instance, a common magnifying or reading glass for viewing. Accordingly, the temperature of the mass is quickly changed upon contact with warmer or colder bodies. A typical dimension for such a bead runs on the order of 0.014" diameter. The conical tip 56 permits bead 54 to be virtually surrounded by liquid, even in drop form, and thereby causes a virtually instantaneous change in the dissipation constant of the thermistor bead 54.

Hair-like leads 57, 58 provides electrical connection to bead 54. Lead 57 runs upwardly coaxially through the glass tip 56 and then, as an insulated conductor, proceeds along the inside of probe 50. Lead 58 is grounded to probe 50. A safety ground connection 59 serves to ground out thumb screw 52, and solenoid cap 37. The upper end of lead 57 is connected to a pin (not shown) behind pin 49.

Circuit means have been provided whereby an accumulated predetermined precise volume of liquid is sensed and dispensed over a period sufficient to insure complete drainage of bucket 19.

In general, therefore, a pulse former and amplifier circuit 60 senses a sharp change in the temperature of the mass of bead 54 and energizes a coil 61 momentarily. Coil 61 serves to close a normally open holding switch 63 against the urging of a spring 64. Switch 63 thereby establishes a holding circuit for a time sufficient to permit complete drainage of liquid from bucket 19.

Thus, a power source 65 serves to energize coil 38, as well as the parallel coupled coil 66, via the pre-set timer 67 of suitable construction, such as employs a switch 68 or the like which is normally closed but which opens after a predetermined period. When switch 68 opens, therefore, valve 25 will be closed by action of spring 36.

Pulse former and amplifier circuit 60 normally holds bead 54 at a predetermined stable temperature. Thus, upon contact with a fluid body at a substantially different temperature, the impedance variation caused by heat transfer between bead 54 and the fluid body can be sensed by circuit 60 and a control impulse generated in coil 61 as previously indicated above.

Circuit 60 is preferably arranged to maintain the temperature of bead 54 substantially above ambient temperature since most fluids will typically be employed under conditions where they will have a stabilized temperature at ambient, or room, temperature, including refrigerated or heated spaces.

Figure 6:
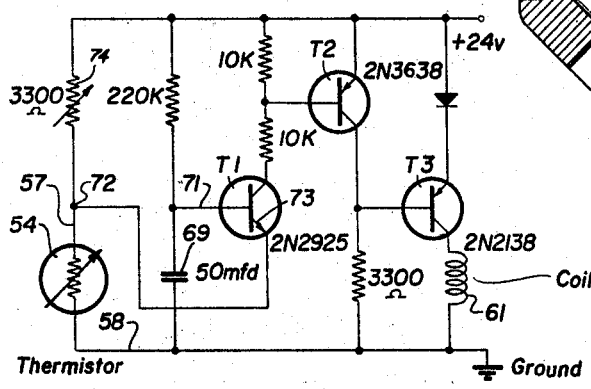
FIGURE 6 shows a control circuit for the circuits of FIGURES 3 and 5.

A circuit for normally holding bead 54 at a stabilized predetermined temperature level, for example, on the order of eighty to one hundred degrees centigrade has been built and operated satisfactorily according to the circuit diagram, and with the values in FIGURE 6. The temperature level can be varied by resistor 74.

As is known, a thermo-responsive element such as thermistor bead 54 will have an increased resistance as it gets colder. Therefore, the circuit shown in FIGURE 6 serves to sense a change in the temperature of bead 54 and is particularly arranged to respond to abrupt drops in temperature encountered by bead 54.

Condenser 69 serves to provide a substantially steady voltage at the base electrode 71 of a transistor T1. Transistor T1 is normally operated in saturation in the circuit shown and is thereby made less sensitive to transient voltages eminating from the supply. When bead 54 encounters a liquid which drops its temperature abruptly the impedance will increase sharply. Thus, the potential at point 72 will go promptly positive thereby raising the potential on the emitter 73 of transistor T1. T1 will thereby by cut off since its base is held by condenser 69 whereby a second transistor T2 will also be switched off. As transistor T2 is switched off, a third transistor T3 will be switched into conduction whereby current will flow through coil 61.

The function of coil 61 in conjunction with a volume dispensing head has previously been described above. As will be further described below, where a drop counting head is employed which relies upon a thermistor bead, coil 61 has been designated 61' which thereby indicates an element of a counter which is advanced in response to each contact with the thermistor bead makes with a flow of discrete drops of fluid.

A drop counting head assembly adapted to be operated in response to a thermo-responsive impedance element, such as the thermistor bead 54, is constructed as now to be described.

When it is desired to change from the measured volume method of operation to a drop counting method, the measured volume dispensing head 20 can be removed from bed 10, merely by lifting it upwardly out of opening 11 and replacing it with a drop counting head 85.

Drop counter dispensing head 85 includes a body member 86 having a lower and upper portion 86a and 86b respectively each of generally rectangular cross section. Body member 86 is formed with a bowl shaped top portion 86c. The spaced sides of lower portion 86a receive a drop counting assembly 90 therebetween.

Assembly 90 includes a fluid delivering control valve 95 and a drop counting arrangement 96. Control valve 95 includes a hose receiving socket 98 drilled to receive a suitable hose end. To the left of socket 98 there is formed a substantially cyindrical recess 99 with a drilled pedestal 100 disposed coaxially therewith. The drilled hole 101 through the center of pedestal 100 communicates with the socket 98. Thus, fluid being fed to the fraction collector enters via socket 98 and hole 101. Across the face of recess 99 and covering hole 101 is disposed a resilient diaphragm 105 of a suitable material, for example such as Teflon ® (i.e. a tetrafluoroethylene polymer) held in place by a retaining ring 106 screwed to the left side of assembly 90.

Drop counting or sensing arrangement 96 includes means for directing each drop of fluid to contact a thermo-responsive impedance element 97. Thus, there is provided a downwardly disposed delivery tube 109 imbedded in the body of assembly 90 and in fluid communication with the lower side of recess 99 by a tubular channel 111 extending through the lower side wall of recess 99 and through the body of assembly 90.

The thermo-responsive element 97 preferably is a miniature thermistor bead embedded, as above, at the apex of a conical glass tip 112. The apex of tip 112 lies directly beneath the channel 111 to be contacted by each drop of liquid delivered. Each drop, therefore, surrounds, element 97 for maximum change in the heat dissipation constant of the bead, and hence, the quickest possible temperature (and impedance) change.

A pair of conductors are electrically coupled to thermistor element 97 for controlling delivery of drops of fluid via channel 111. Thus, a lead 57' connects to terminal 113 and a ground lead 58' connects to terminal 114. Teminals 113 and 114 are adapted to be coupled into the pulse forming and amplifying circuit 60 (previously described) via leads 57, 58 thereof.

In order to control hole 101 in pedestal 100, a resilient knob 120 of a suitable material, such as rubber, is mounted upon a valve control lever arm 122 pivoted about a pin 124 extending between the side walls of body member 86. In order to actuate valve control lever arm 122, its upper end is provided with a dog-leg 126 having a vertical extension 127 which carries a roller 128 arranged to engage a conical ended push rod 129. Push rod 129 is arranged to be driven downward by movement of an armature 132 of a push type solenoid coil 133. Solenoid 133 includes a spring 135 between an upper cap 137 and a bottom cap 138. Spring 135 urges armature 132 upwardly. Upper cap portion 137 retains a soft iron armature slug 132 so that energizing the solenoid coil 133 causes slug 132 to move downwardly. Accordingly, as coil 133 is energized, armature 132 is moved downwardly rotating roller 128 counter clockwise so as to move arm 122 clockwise against the force of a spring 134 thereby pushing knob 120 against diaphragm 105 to close off the left end of opening 101.

Closure of hole 101 by diaphragm 105 immediately locks all fluid present in tubular channel 111 by creating a vacuum which overcomes gravitational flow of fluid therethrough. On the other hand when knob 120 is free to move away from the back of diaphragm 105, fluid emerges in discrete drops from a path defined by opening 101, recess 99, and channel 111 so that each discrete drop contacts tip 112 to be sensed by circuit 60 and counted as now to be described.

A circuit 140 for counting each discrete drop is provided wherein after a predetermined number of drops have been counted, the valve 95 is closed to interrupt the feeding of such drops of fluid.

Circuit 140 includes the thermo-responsive element 97 which serves, via leads 57, 58 to provide signals to the pulse former and amplifier circuit 60, previously described. Circuit 60, operates a coil 61' which, in the drop counting mode, is disposed to operate a counter 142. Counter 142 is of conventional design wherein each pulse received advances it one unit until a predetermined number of units have been counted. At that time, an output pulse of predetermined duration is generated.

In the present instance, as schematically shown, there is indicated a switch 143 which is normally open and which is suitably arranged to be closed at the end of a predetermined count. Thus, coil 133 would be energized at the end of the predetermined count to provide a downward thrust to its armature and thereby rotate lever arm 122 clockwise so to press the resilient knob 120 to form a sealing relation with respect to hole 101. The temporary closure of hole 101 affords time enough to relocate the drop counting head relative to the next test tube intended to receive a collected fraction.

From the foregoing it will be readily evident that there has been provided an improved drop counting fraction collector head and an improved volume collecting head each of which is suitable for use with fluids such as chloroform, acetone, methanol, ether, hexane, benzene, and the like which are substantially non-conductive fluids. The thermistor is in a glass bead on the order of 0.014 inch diameter, and the rod diameter is less than 0.020 inch whereby a hanging-on droplet will avoided. The thermistor is continuously maintained at a predetermined temperature level by an extremely small energy, on the order of 0.01 watt, which keeps its temperature some 60 to 70 degrees centigrade above room temperature. The temperature variation occasioned by contact of the thermistor bead with a liquid body provides the signal which operates the fraction collector. Using the above construction it has been possible to count two drops per second with reliability. At a count of two drops per second something on the order of 100 milliliters per hour can be collected. It will, therefore, be apparent that much greater flow than the usual flow rate at the drop counting method can be handled by apparatus as above.

Therefore, while there have been shown and described and pointed out the fundamental novel features of the invention as applied to preferred embodiments, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

We claim:

1. In a fraction collector wherein predetermined quantities of fluid are delivered to each of a number of test tubes disposed in an array, a dispensing unit comprising electro-mechanical means for establishing said predetermined quantities, the last named means including valve means controlling delivery of said quantities, a pair of conductors coupled to control said electro-mechanical means, a thermo-responsive impedance element, said conductors being disposed to be electrically coupled to said element, circuit means for normally holding said element at a predetermined temperature, means for supporting said element to be contacted by the fluid to change the temperature of said element when so contacted, said circuit means serving to sense said temperature change and respond thereto to actuate said valve means to effect said control.

2. Fluid dispensing apparatus according to claim 1 wherein said element is a minature thermistor bead having a diameter on the order of 0.014 inch to quickly change temperature upon being contacted by fluid.

3. Fluid dispensing apparatus according to claim 2 further including a conical glass tip for supporting said bead, said bead being embedded at the apex of the tip to cause drops of liquid formed on the tip to surround said bead in heat transfer relation.

4. In a fraction collector wherein predetermined quantities of fluid are delivered to each of a number of test tubes disposed in an array, having a counter, and further having a dispensing unit including electro-mechanical means for establishing said predetermined quantities, fluid delivery apparatus comprising a pair of conductors operatively controlling said electro-mechanical means, valve means serving to break a fluid stream into discrete drops thereof, means directing said discrete drops of fluid in a path, thermo-responsive impedance means in said path disposed to be contacted by each of said drops to vary the impedance between said conductors to effect a discrete coupling for each drop, and circuit means connected to advance said counter in response to each said coupling between said conductors whereby said drops can be counted.

5. In a fraction collector wherein predetermined quantities of fluid are delivered to each of a number of test tubes disposed in an array, a dispensing unit comprising electro-mechanical means for establishing said predetermined quantities, the last named means including valve means controlling delivery of said quantities, reservoir means having an outlet controlled by said valve means, a fluid receiving chamber upstream of said reservoir means and disposed whereby fluid being supplied to the dispensing unit to be delivered can be temporarily accumulated during delivery of a measured volume of fluid, said conductors being disposed in predetermined spaced apart relation with respect to each other, an impedance element within said reservoir coupling said conductors to provide an impedance variation between the conductors upon contact with said fluid by the element, and a solenoid coupled to operate said valve means and connected to respond to said variation and deliver a measured volume of said fluid via said outlet.

6. A fluid dispensing unit of the type suitable for use in fluid fraction collectors having means for positioning a dispensing unit into delivery alignment with each of a plurality of test tubes arrayed to receive fluid dispensed thereto, the last named means including a movable bed formed with an upwardly extending hole therethrough, said fluid dispensing unit comprising a housing, the exterior of said housing being formed to be snugly received in and readily removable from said hole to be carried by said bed, said housing carrying delivery means for directing a supply of fluid in a path to said test tubes, a valve controlling movement of fluid along said path, and means controlling said valve including a thermo-responsive impedance element, a pair of conductors coupled to said element and disposing said element to be contacted by said fluid whereby the fluid to be delivered to each test tube is controlled by said contacting.

7. For use in a fluid fraction collector having a plurality of test tubes arrayed to receive fluid dispensed thereto, and having means for relatively positioning a dispensing unit for delivery of the fluid to said test tubes: a dispensing unit comprising, in combination, conduit means adapted to be coupled to a source of fluid and including a discharge end for delivering said fluid to said test tubes, first circuit means determining the quantity of fluid delivered to each test tube, electro-mechanical control means responsive to said circuit means for starting and stopping delivery of said fluid, said circuit means including a pair of electrical conductors, a thermo-responsive impedance element between said conductors and oriented with respect to said conduit means to be contacted with said fluid to effect said determination, and second circuit means for normally holding said element at a predetermined reference level of temperature.

8. Dispensing apparatus according to claim 1 wherein said circuit means senses a transient variation in the voltage across said impedance element provided by said temperature change.

References Cited by the Examiner
UNITED STATES PATENTS 2,576,808 11/1951 Perkins _____ 200—136 X
2,672,271  3/1954 Gorham _____ 222—76 X ROBERT B. REEVES, *Primary Examiner.*

HADD S. LANE, *Examiner.*